US012561529B1

US 12,561,529 B1

(12) United States Patent
Jin et al.

(10) Patent No.: US 12,561,529 B1
(45) Date of Patent: Feb. 24, 2026

(54) SYSTEMS FOR ENCODING DOCUMENTS AND GENERATING SEMANTIC IDENTIFIERS

(71) Applicant: AMAZON TECHNOLOGIES, INC., Seattle, WA (US)

(72) Inventors: Bowen Jin, Champaign, IL (US); Xianfeng Tang, San Jose, CA (US); Zhengyang Wang, Sammamish, WA (US); Ruirui Li, Fremont, CA (US); Suhang Wang, State College, PA (US); Qingyu Yin, Mountain View, CA (US); Hanqing Lu, Mountain View, CA (US); Zheng Li, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 207 days.

(21) Appl. No.: 18/539,736

(22) Filed: Dec. 14, 2023

(51) Int. Cl.
G06F 40/30 (2020.01)
(52) U.S. Cl.
CPC .................................... G06F 40/30 (2020.01)
(58) Field of Classification Search
CPC ...................................................... G06F 40/30
See application file for complete search history.

(56) References Cited

U.S. PATENT DOCUMENTS

2008/0103773 A1* 5/2008 Kirshenbaum ......... G06F 40/30
                                                           704/252
2018/0232608 A1* 8/2018 Pradeep ............. G08B 13/1427
2023/0115028 A1* 4/2023 Arunachala ............. A63F 13/67
                                                           345/619

OTHER PUBLICATIONS

Bajaj, et al., "MS MARCO: A Human Generated MAchine Reading Comprehension Dataset", Microsoft AI & Research, Oct. 31, 2018, 11 pgs. Retrieved from the Internet: URL: https://arxiv.org/pdf/1611.09268.pdf.
Brown, et al., "Language Models are Few-Shot Learners", OpenAI, Jul. 22, 2020, 75 pgs. Retrieved from the Internet: URL: https://arxiv.org/pdf/2005.14165.pdf.
Chen, et al., "CorpusBrain: Pre-train a Generative Retrieval Model for Knowledge-Intensive Language Tasks", Aug. 16, 2022, 10 pgs. Retrieved from the Internet: URL: https://arxiv.org/pdf/2208.07652.pdf.

(Continued)

*Primary Examiner* — Eric Yen

(74) *Attorney, Agent, or Firm* — Lindauer Law, PLLC

(57) ABSTRACT

A semantic identifier that represents information within a document may be determined by training a language model or other machine learning model using a self-supervised process. The model encodes text to generate an embedding. A decoder determines a semantic identifier token that represents information in the text based on the embedding and a previous semantic identifier token if present. The identifier determined by the decoder is aligned with one of a selected set of semantic identifiers indicated in codebook data. To determine the accuracy of the semantic identifier token, a second decoder is used to attempt to reconstruct the original text using the semantic identifier token and a portion of the original text. Differences between the reconstructed text and the original text are used to determine a loss value, and the parameters of the machine learning model or the codebook data are trained based on minimizing the loss value.

20 Claims, 6 Drawing Sheets

(56)        References Cited

OTHER PUBLICATIONS

Clark, et al., "Electra: Pre-training text encoders as discriminators rather than generators", Mar. 23, 2020, 18 pgs. Retrieved from the Internet: URL: https://arxiv.org/pdf/2003.10555.pdf.

Craswell, et al., "Overview of the trec 2019 deep learning track", Mar. 18, 2020, 22 pgs. Retrieved from the Internet: URL: https://arxiv.org/pdf/2003.07820.pdf.

De Cao, et al., "Autoregressive entity retrieval", Mar. 24, 2021, 20 pgs. Retrieved from the Internet: URL: https://arxiv.org/pdf/2010.00904.pdf.

Devlin, et al., "BERT: Pre-training of Deep Bidirectional Transformers for Language Understanding", Google AI Language, May 2, 2018, 16 pgs. Retrieved from the Internet: URL: https://arxiv.org/pdf/1810.04805.pdf.

Esser, et al., "Taming Transformers for High-Resolution Image Synthesis", Heidelberg University, Heidelberg Collaboratory for Image Processing, IWR, Jun. 23, 2021, 52 pgs. Retrieved from the Internet: URL: https://arxiv.org/pdf/2012.09841.pdf.

He, et al., "Lagging inference networks and posterior collapse in variational autoencoders", Jan. 28, 2019, 15 pgs. Retrieved from the Internet: URL: https://arxiv.org/pdf/1901.05534.pdf.

He, et al., "Ups and Downs: Modeling the Visual Evolution of Fashion Trends with One-Class Collaborative Filtering", University of California, San Diego, Feb. 4, 2016, 11 pgs. Retrieved from the Internet: URL: https://arxiv.org/pdf/1602.01585.pdf.

Hidasi, et al., "Session-based recommendations with recurrent neural networks", Mar. 29, 2016, 10 pgs. Retrieved from the Internet: URL: https://arxiv.org/pdf/1511.06939.pdf.

Horgan, J., "From Complexity to Perplexity", Scientific American, Jun. 1995, 17 pgs. Retrieved from the Internet: URL: http://www2.econ.iastate.edu/tesfatsi/hogan.complexperplex.htm.

Jang, et al., "Categorical reparameterization with gumbel-softmax", Aug. 5, 2017, 13 pgs. Retrieved from the Internet: URL: https://arxiv.org/pdf/1611.01144.pdf.

Karpukhin, et al., "Dense Passage Retrieval for Open-Domain Question Answering", Sep. 30, 2020, 13 pgs. Retrieved from the Internet: URL: https://arxiv.org/pdf/2004.04906.pdf.

Kwiatkowski, et al., "Natural Questions: A Benchmark for Question Answering Research", Google Research, Jul. 2019, 14 pgs. Retrieved from the Internet: URL: https://aclanthology.org/Q19-1026.pdf.

Lee, et al., "Autoregressive Image Generation using Residual Quantization", Mar. 9, 2022, 30 pgs. Retrieved from the Internet: URL: https://arxiv.org/pdf/2203.01941.pdf.

Lewis, et al., "BART: Denoising Sequence-to-Sequence Pre-training for Natural Language Generation, Translation, and Comprehension", Facebook AI, Oct. 29, 2019, 10 pgs. Retrieved from the Internet: URL: https://arxiv.org/ pdf/1910.13461.pdf.

Liu, et al., "ROBERTa: A Robustly Optimized BERT Pretraining Approach", Jul. 26, 2019, 13 pgs. Retrieved from the Internet: URL: https://arxiv.org/pdf/1907.11692.pdf.

Lund, et al., "Chatting about ChatGPT: How may AI and GPT impact academia and libraries? ", Library Hi Tech News, Jan. 2023, 9 pgs. Retrieved from the Internet: URL: https://deliverypdf.ssrn.com/delivery.php?ID=690083116027120088074092083104006126014080037007054060088097118105090004071002122005030030106023013098105082006119086080096101106045047052093079076116117123127086008008079079111024009026070109005122016091126004113029114083014092001105031118115098074006&EXT=pdf&INDEX=TRUE.

Ma, et al., "Hierarchical Gating Networks for Sequential Recommendation", Jun. 21. 2019, 9 pgs. Retrieved from the Internet: URL: https://arxiv.org/pdf/1906.09217.pdf.

Meng, et al., "COCO-LM: Correcting and Contrasting Text Sequences for Language Model Pretraining", Oct. 27, 2021, 16 pgs. Retrieved from the Internet: URL: https://arxiv.org/pdf/2102.08473.pdf.

Murtagh, et al., "Algorithms for hierarchical clustering: an overview", Jan. 2011, 12 pgs. Retrieved from the Internet: URL: http://i2pc.es/coss/Docencia/SignalProcessingReviews/Murtagh2012.pdf.

Ni, et al., "Sentence-T5: Scalable Sentence Encoders from Pre-trained Text-to-Text Models", Google Research, Dec. 14, 2021, 11 pgs. Retrieved from the Internet: URL: https://arxiv.org/pdf/2108.08877.pdf.

Nogueira, et al., "From doc2query to docTTTTTquery", Dec. 2019, 3 pgs. Retrieved from the Internet: URL: https://www.researchgate.net/profile/Rodrigo-Nogueira-19/publication/360890853_From_doc2query_to_docTTTTTquery/links/6290b0e98d19206823dfcc55/From-doc2query-to-docTTTTTquery.pdf.

Openai, "GPT-4 Technical Report", Mar. 27, 2023, 100 pgs. Retrieved from the Internet: URL: https://arxiv.org/pdf/2303.08774.pdf.

Opitz, et al., "Macro F1 and Macro F1", Feb. 8, 2021, 12 pgs. Retrieved from the Internet: URL: https://arxiv.org/pdf/1911.03347.pdf.

Peters, et al., "Deep contextualized word representations", Mar. 22, 2018, 15 pgs. Retrieved from the Internet: URL: https://arxiv.org/pdf/1802.05365.pdf.

Pradeep, et al., "How Does Generative Retrieval Scale to Millions of Passages?", May 19, 2023, 15 pgs. Retrieved from the Internet: URL: https://arxiv.org/pdf/2305.11841.pdf.

Radford, et al., "Language Models are Unsupervised Multitask Learners", OpenAI, 2019, 24 pgs. Retrieved from the Internet: URL: https://insightcivic.s3.us-east-1.amazonaws.com/language-models.pdf.

Raffel, et al., "Exploring the Limits of Transfer Learning with a Unified Text-to-Text Transformer", Google, Jun. 20, 2020, 10 pgs. Retrieved from the Internet: URL: https://arxiv.org/pdf/1910.10683.pdf.

Rajput, et al., "Recommender Systems with Generative Retrieval", Nov. 3, 2023, 17 pgs. Retrieved from the Internet: URL: https://arxiv.org/pdf/2305.05065.pdf.

Reddy, et al., "Shopping Queries Dataset: A Large-Scale ESCI Benchmark for Improving Product Search", Amazon USA, Jun. 14, 2022, 5 pgs. Retrieved from the Internet: URL: https://arxiv.org/pdf/2206.06588.pdf.

Ren, et al., "TOME: A Two-stage Approach for Model-based Retrieval", May 18, 2023, 11 pgs. Retrieved from the Internet: URL: https://arxiv.org/pdf/2305.11161.pdf.

Robertson, et al., "The Probabilistic Relevance Framework: BM25 and Beyond", 2009, 59 pgs. Retrieved from the Internet: URL: https://www.staff.city.ac.uk/~sbrp622/papers/foundations_bm25_review.pdf.

Sun, et al., "BERT4Rec: Sequential Recommendation with Bidirectional Encoder Representations from Transformer", Alibaba Group, Aug. 21, 2019, 11 pgs. Retrieved from the Internet: URL: https://arxiv.org/pdf/1904.06690.pdf.

Tang, et al., "Semantic-Enhanced Differentiable Search Index Inspired by Learning Strategies", May 24, 2023, 10 pgs. Retrieved from the Internet: URL: https://arxiv.org/pdf/2305.15115.pdf.

Tay, et al., "Transformer Memory as a Differentiable Search Index", Google Research, Oct. 21, 2022, 14 pgs. Retrieved from the Internet: URL: https://arxiv.org/pdf/2202.06991.pdf.

Van Den Oord, et al., "Neural Discrete Representation Learning", DeepMind, May 30, 2018, 11 pgs. Retrieved from the Internet: URL: https://arxiv.org/pdf/1711.00937.pdf.

Vinh, et al., "Information theoretic measures for clusterings comparison: is a correction for chance necessary?", 26th Annual International Confernece on Machine Learning, Jun. 14, 2009, 7 pgs. Retrieved from the Internet: URL: https://dl.acm.org/doi/10.1145/1553374.1553511.

Wang, et al., "A Neural Corpus Indexer for Document Retrieval", Feb. 12, 2023, 19 pgs. Retrieved from the Internet: URL: https://arxiv.org/pdf/2206.02743.pdf.

Xiao, et al., "RetroMAE: Pre-Training Retrieval-oriented Language Models Via Masked Auto-Encoder", Oct. 17, 2022, 11 pgs. Retrieved from the Internet: URL: https://arxiv.org/pdf/2205.12035.pdf.

Yang, et al., "XLNet: Generalized Autoregressive Pretraining for Language Understanding", Jan. 2, 2020, 18 pgs. Retrieved from the Internet: URL: https://arxiv.org/pdf/1906.08237.pdf.

Yasunaga, et al., "LinkBERT: Pretraining Language Models with Document Links", Stanford University, Mar. 29, 2022, 14 pgs. Retrieved from the Internet: URL: https://arxiv.org/pdf/2203.15827.pdf.

(56) References Cited

OTHER PUBLICATIONS

Zhang, et al., "Feature-level Deeper Self-Attention Network for Sequential Recommendation", 2019, 7 pgs. Retrieved from the Internet: URL: https://www.ijcai.org/proceedings/2019/0600.pdf.

* cited by examiner

TIME = T1                                                                    100

TIME = T2                                                                100

TIME = T3

100

200

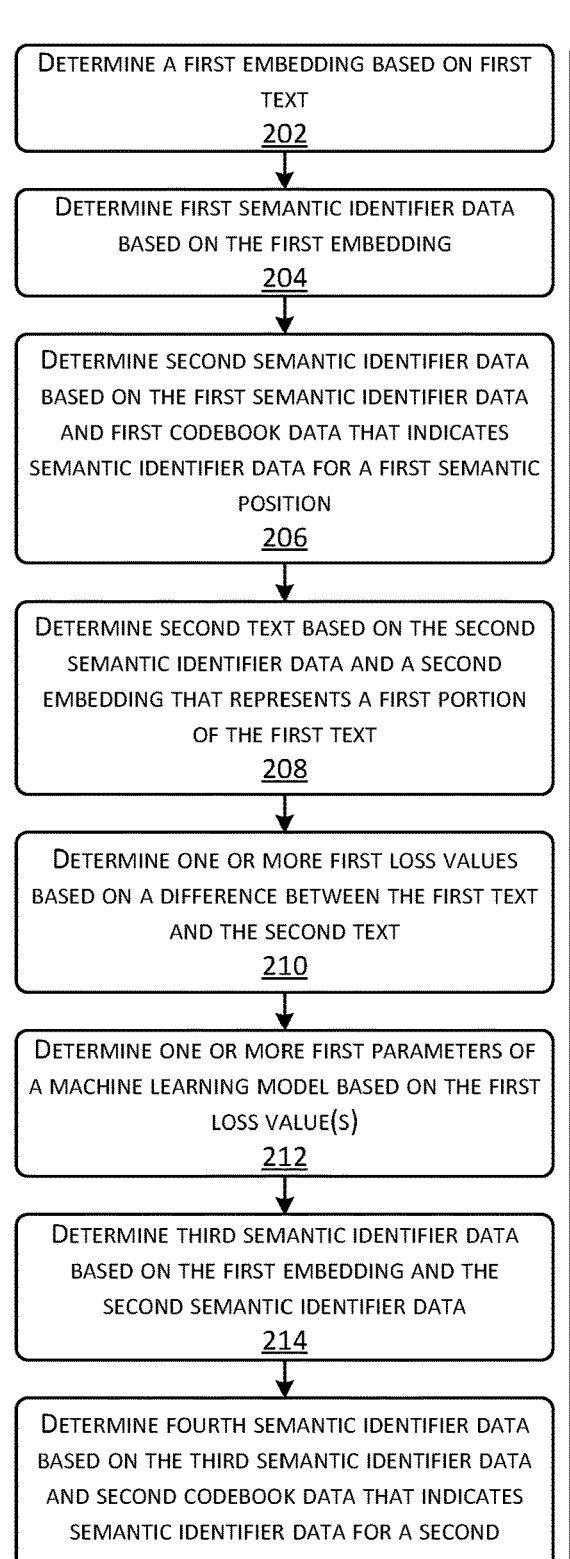

DETERMINE A FIRST EMBEDDING BASED ON FIRST TEXT
202

DETERMINE FIRST SEMANTIC IDENTIFIER DATA BASED ON THE FIRST EMBEDDING
204

DETERMINE SECOND SEMANTIC IDENTIFIER DATA BASED ON THE FIRST SEMANTIC IDENTIFIER DATA AND FIRST CODEBOOK DATA THAT INDICATES SEMANTIC IDENTIFIER DATA FOR A FIRST SEMANTIC POSITION
206

DETERMINE SECOND TEXT BASED ON THE SECOND SEMANTIC IDENTIFIER DATA AND A SECOND EMBEDDING THAT REPRESENTS A FIRST PORTION OF THE FIRST TEXT
208

DETERMINE ONE OR MORE FIRST LOSS VALUES BASED ON A DIFFERENCE BETWEEN THE FIRST TEXT AND THE SECOND TEXT
210

DETERMINE ONE OR MORE FIRST PARAMETERS OF A MACHINE LEARNING MODEL BASED ON THE FIRST LOSS VALUE(S)
212

DETERMINE THIRD SEMANTIC IDENTIFIER DATA BASED ON THE FIRST EMBEDDING AND THE SECOND SEMANTIC IDENTIFIER DATA
214

DETERMINE FOURTH SEMANTIC IDENTIFIER DATA BASED ON THE THIRD SEMANTIC IDENTIFIER DATA AND SECOND CODEBOOK DATA THAT INDICATES SEMANTIC IDENTIFIER DATA FOR A SECOND SEMANTIC POSITION
216

DETERMINE THIRD TEXT BASED ON THE FOURTH SEMANTIC IDENTIFIER DATA AND A THIRD EMBEDDING THAT REPRESENTS A SECOND PORTION OF THE FIRST TEXT THAT IS SMALLER THAN THE FIRST PORTION
218

DETERMINE ONE OR MORE SECOND LOSS VALUES BASED ON A DIFFERENCE BETWEEN THE FIRST TEXT AND THE THIRD TEXT
220

DETERMINE ONE OR MORE SECOND PARAMETERS OF THE MACHINE LEARNING MODEL BASED ON THE SECOND LOSS VALUE(S)
222

DETERMINE FIFTH SEMANTIC IDENTIFIER DATA BASED ON THE FIRST EMBEDDING AND THE FOURTH SEMANTIC IDENTIFIER DATA
224

DETERMINE SIXTH SEMANTIC IDENTIFIER DATA BASED ON THE FIFTH SEMANTIC IDENTIFIER DATA AND THIRD CODEBOOK DATA THAT INDICATES SEMANTIC IDENTIFIER DATA FOR A THIRD SEMANTIC POSITION
226

DETERMINE FOURTH TEXT BASED ON THE SIXTH SEMANTIC IDENTIFIER DATA AND A FOURTH EMBEDDING THAT REPRESENTS A THIRD PORTION OF THE FIRST TEXT THAT IS SMALLER THAN THE SECOND PORTION
228

DETERMINE ONE OR MORE THIRD LOSS VALUES BASED ON A DIFFERENCE BETWEEN THE FIRST TEXT AND THE FOURTH TEXT
230

DETERMINE ONE OR MORE THIRD PARAMETERS OF THE MACHINE LEARNING MODEL BASED ON THE THIRD LOSS VALUE(S)
232

SYSTEMS FOR ENCODING DOCUMENTS AND GENERATING SEMANTIC IDENTIFIERS

BACKGROUND

Semantic identifiers assigned to documents or other bodies of text may be used for indexing, searching, and analysis, and may also represent the content of the documents. For example, documents having similar semantic identifiers may include content having similar semantic meanings. Language models may be used to learn mappings between semantic identifiers and the content of documents, which may enable semantic identifiers to be used for tasks such as document recommendation and retrieval. However, the task of encoding documents and assigning semantic identifiers to the documents typically requires well-trained machine learning models and a two-step process in which encoding of documents and assignment of semantic identifiers is performed separately.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 is a flow diagram depicting an implementation of a method for training a machine learning system to determine semantic identifiers based on the text of received documents.

Figure 1A:
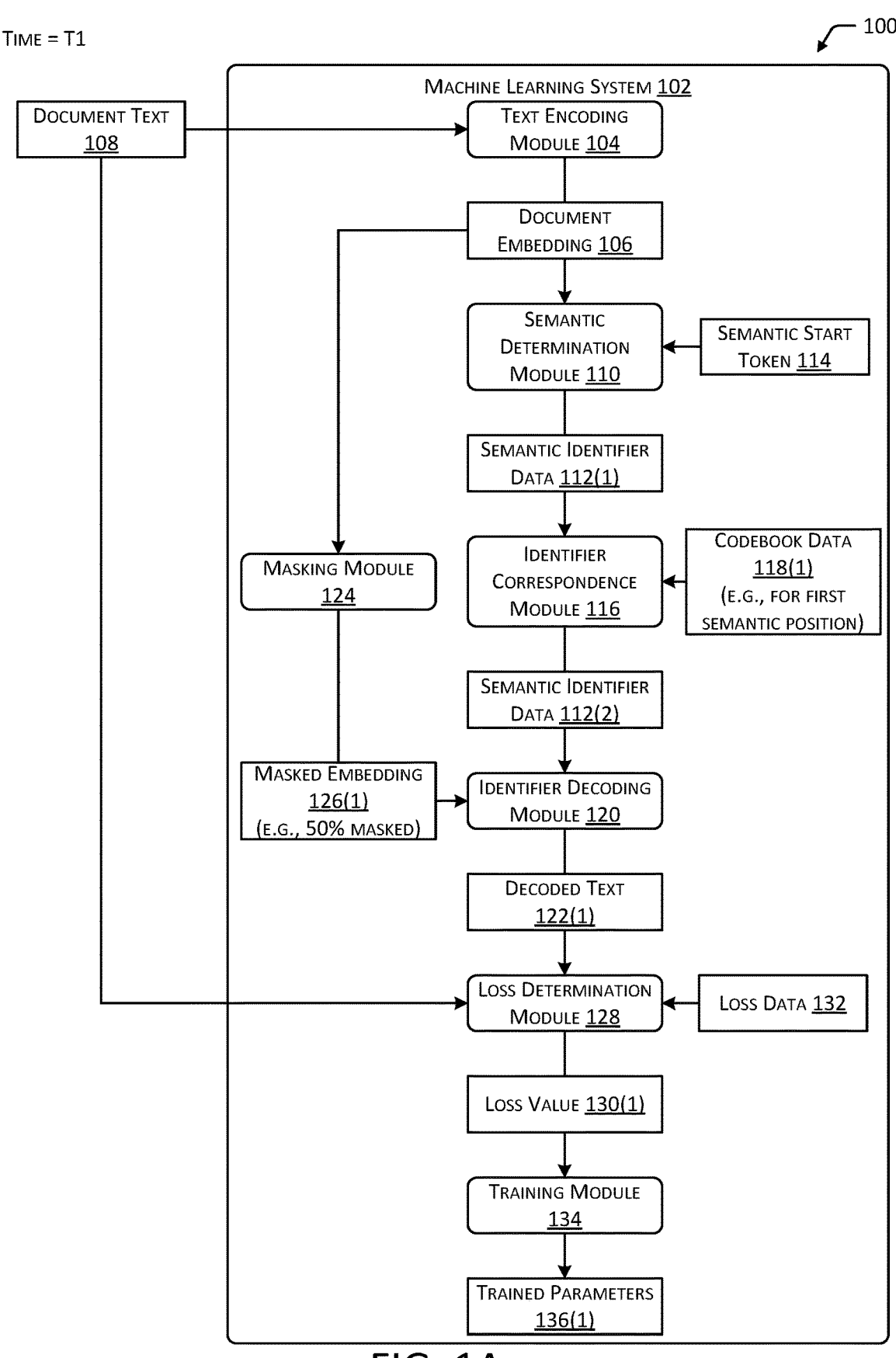
FIGS. 1A-1C are a diagram depicting an implementation of a system for training a machine learning system to determine semantic identifiers based on the text of received documents.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Documents or other bodies of text may be assigned identifiers to enable the documents to be indexed and searched based on their identifiers. For example, an identifier for a document may correspond to a category or another characteristic of the content included in the document. Use of language models to learn mappings between document identifiers and the content of the corresponding document has enabled the identifier for a document to represent the content of the document, facilitating other tasks such as recommendation, retrieval, ranking, and document understanding. Identifiers that represent the content of a document have been termed "semantic identifiers", which typically include multiple tokens, the value of each token representing at least a portion of the content and the position of each token representing the granularity of the document characteristics represented by the token. For example, a first document may be represented by a semantic identifier that includes three tokens. If the semantic identifier for a second document includes tokens having identical values in the first and second positions, but a different value or token in the third position, this may indicate that the documents include content having a similar semantic meaning. However, if the semantic identifier for the second document includes a token having a different value in the first position, this may indicate that the content of the documents has different semantic meanings.

Large language models, or other types of machine learning models, may be used to assign semantic identifiers to documents based on the text of the documents, which may cause similar documents to be assigned similar semantic identifiers. However, typical processes for determining and assigning semantic identifiers to documents use a two-step process that requires trained machine learning models to encode the text of the documents, and to determine semantic identifiers based on the encoded document text.

Described in this disclosure are techniques for training a machine learning model to determine semantic identifiers for documents that represent the semantic meaning of the text within the documents, using self-supervised signals. The machine learning model may include an encoder that determines embeddings based on the text of documents. The machine learning model may also include a decoder that determines semantic identifier tokens based on the embeddings and based on previously-determined semantic identifier tokens for previous positions in the semantic identifier, when present. The machine learning model may also include learnable codebook data for each semantic identifier position that includes a plurality of possible semantic identifier tokens for a given semantic identifier position. For example, first semantic identifier data determined using the decoder may represent a soft value that does not necessarily match one of the tokens indicated in the codebook data, and correspondence between the semantic identifier data and the codebook data may be used to determine second semantic identifier data from the codebook data that is the most similar to the first semantic identifier data determined using the decoder.

For example, a document that includes text may be provided as an input to the encoder, which may determine an embedding, which may include a latent vector representation of the text of the document that accounts for the text itself as well as the positions of text relative to other text. Therefore, the embedding may represent semantic meanings of the text. The embedding may be provided as an input to a first decoder, which may determine first semantic identifier data based on the embedding. The first semantic identifier data may represent a portion of a semantic identifier for the document, such as a token associated with a particular position within the semantic identifier. When the semantic identifier data is associated with a position of the semantic identifier other than the first position, the semantic identifier data determined for the previous position may also be provided as an input to the first decoder. For example, because a previously-determined semantic identifier token also represents the text of the document, the previously-determined token may affect the semantic identifier data determined for a subsequent position of the semantic identifier. In cases where the semantic identifier data is determined for the first position of the semantic identifier, use of previously-determined semantic identifier data may not be possible, and a start token or placeholder token may be used in place of previous semantic identifier data, or use of previous semantic identifier data may be omitted.

The second semantic identifier data determined using the first decoder and codebook data may then be provided to a second decoder, such as a shallow transformer, which may attempt to reconstruct the original text of the document based on the second semantic identifier data. In some implementations, the second decoder may also be provided with an embedding that represents a portion of the original text of the document. For example, a portion of the original text of the document may be masked, and an embedding may be generated that represents the portion of the document text that is not masked. Continuing the example, because predicting the original document text solely using a semantic identifier token may not be possible, especially when the semantic identifier token is associated with an earlier position in the semantic identifier, providing an embedding that represents a portion of the document text may improve the accuracy and amount of text that may be reconstructed using the second decoder.

A loss value may be determined based on a difference between the text determined using the second decoder and the original text of the document. Based on this loss value, parameters associated with one or more of the encoder, the first decoder, or the codebook data may be modified. This process may be repeated to determine subsequent semantic identifier data for subsequent positions of the semantic identifier of the document. For example, after determining the second semantic identifier data, as described previously, the embedding representing the document text and the second semantic identifier data may be provided as inputs to the first decoder, which may determine third semantic identifier data associated with a subsequent position of the semantic identifier. Correspondence between the third semantic identifier data and codebook data for the subsequent position may be used to determine fourth semantic identifier data that is included in the codebook data and is similar to the third semantic identifier data.

The fourth semantic identifier data may then be provided to the second decoder to determine reconstructed document text. In some implementations, an embedding representing a portion of the original text may also be provided to the second decoder as an input, however the portion represented by the embedding may be smaller than the portion provided with the second sematic identifier data. For example, because the fourth semantic identifier data includes a greater amount of semantic information (due to use of the second semantic identifier data as an input to the first decoder), a smaller portion of the original text may be usable when reconstructing the document text based on the fourth semantic identifier data. A second loss value may be determined based on a difference between the text determined using the second decoder and the original text, which may be used to modify parameters of the encoder, the first decoder, or the second codebook data.

This process may be repeated until semantic identifier tokens for each position of a semantic identifier for the document have been determined, with the portion of the original text provided to the second decoder as an input decreasing for each successive position of the semantic identifier. In one implementation, the portion of the original text provided when determining a semantic identifier token for a first position may include fifty percent of the original text, the portion provided in association with a second position of the semantic identifier may include thirty percent of the original text, and the portion provided in association with a third position of the sematic identifier may include ten percent of the original text. In some implementations, after determining semantic identifier tokens for the first, second, and third positions for a document, a semantic identifier token for a fourth position may be assigned to the document. For example, in some cases, due to use of codebook data to determine semantic identifier tokens, some documents may be associated with identical semantic identifier tokens for the first, second, and third positions, and association of a semantic identifier token for a fourth position may be used to differentiate the documents based on their semantic identifiers. In some implementations, the semantic identifier token for the fourth position may include a random or pseudo-random value. While the process is described above with regard to a single document, the machine learning model may be trained by performing this process using multiple documents.

After the machine learning model has been trained, when a document is received as an input to the model, an embedding may be determined based on the document text. A first portion of a semantic identifier (e.g., a value for a first position of the semantic identifier) may be determined based on the embedding. A second portion of the semantic identifier (e.g., a value for a second position of the semantic identifier) may be determined based on the embedding and the first portion. A third portion of the semantic identifier (e.g., a value for a third position of the semantic identifier) may be determined based on the embedding and the second portion, and in some implementations further based on the first portion. Subsequent portions of the semantic identifier may similarly be determined using the embedding and one or more previously-determined portions of the semantic identifier, or in some implementations, a subsequent portion of a semantic identifier may include a random or pseudo-random value.

Implementations described herein may therefore enable a machine learning model to be trained to determine semantic identifiers that represent the semantic meanings of document text using self-supervised signals, which utilizes less time and computational resources than a conventional two-step process that includes separately-trained encoders and semantic indexers.

Figure 1B:
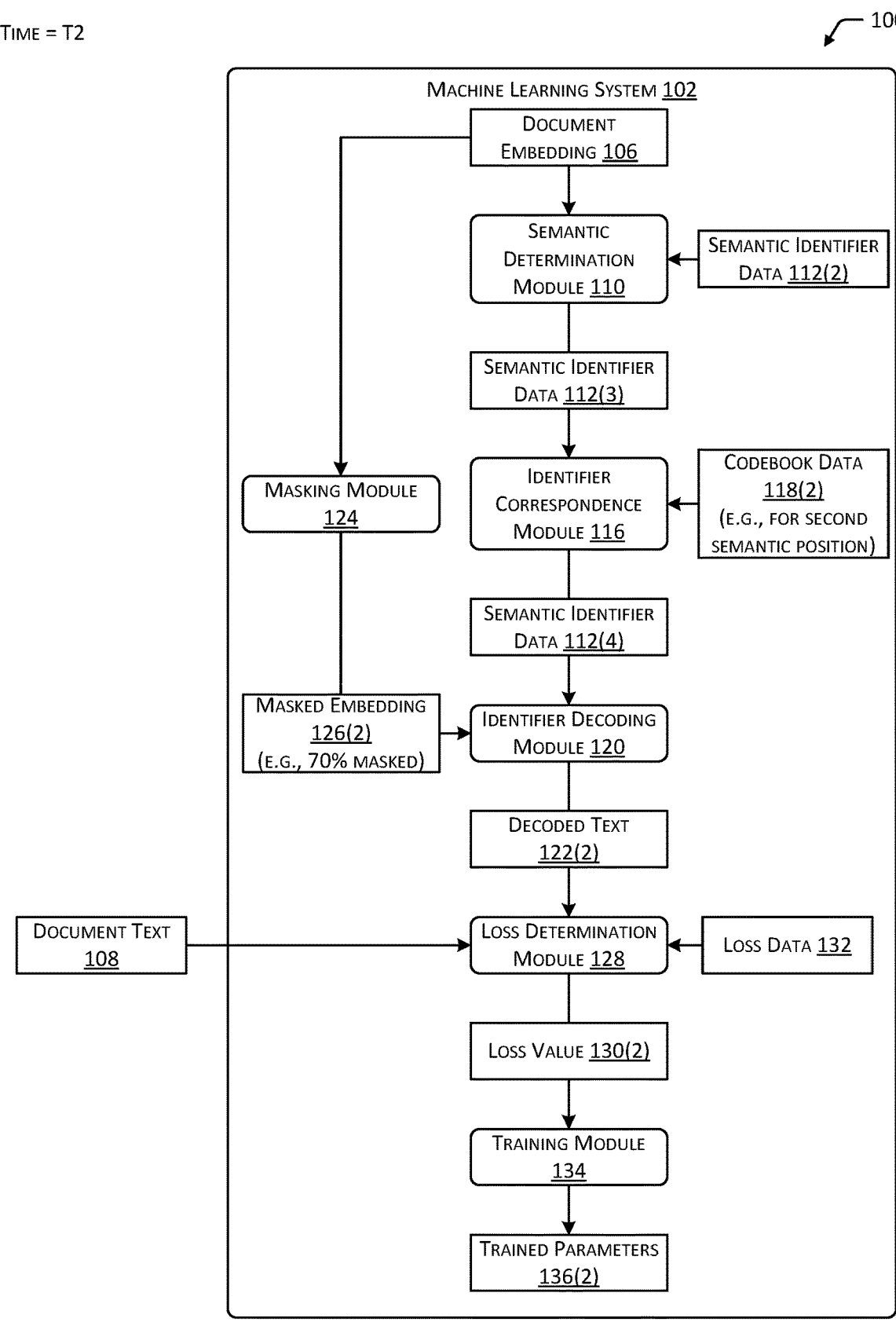
Figure 1C:
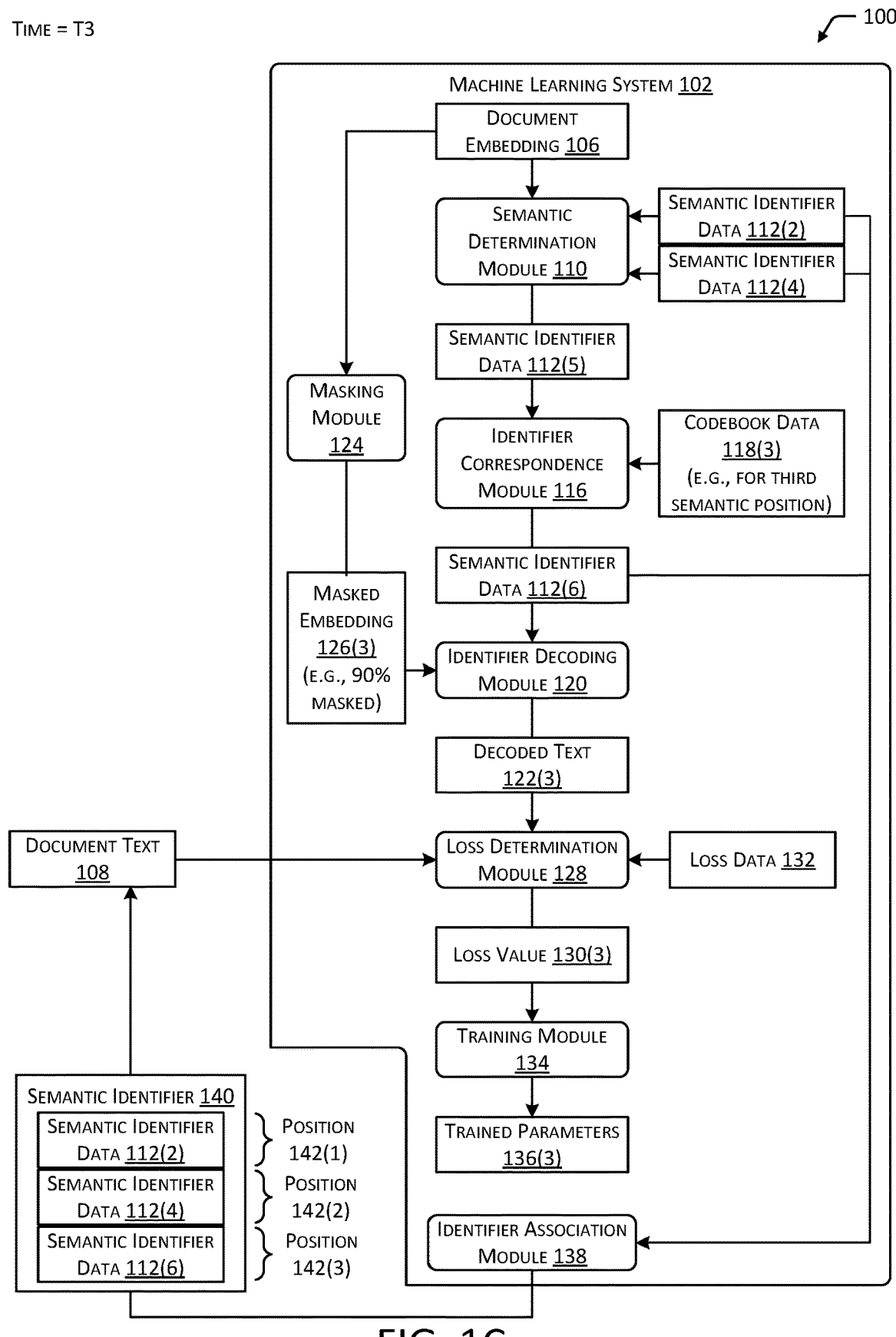

FIGS. 1A-1C are a diagram 100 depicting an implementation of a system for training a machine learning system 102 to determine semantic identifiers based on the text of received documents. The machine learning system 102 may include a language model or other type of machine learning system that is able to receive text as an input and determine output based on the text. As described previously, the machine learning system may include an encoder for determining embeddings based on the text of documents and a decoder or other type of module for determining semantic identifier tokens based on embeddings. In one implementation, the encoder and first decoder may include a T5 encoder-decoder transformer architecture. A second decoder may be used to attempt to reconstruct the original text based on the determined semantic identifier tokens. Differences between the reconstructed text and the original text of the documents may then be used in a loss determination, which may in turn be used to determine one or more parameters of the machine learning system 102.

A text encoding module 104 of the machine learning system 102 may determine a document embedding 106 based on document text 108. The document text 108 may be associated with one or more documents or other items that include text. In some implementations, the document(s) may include other types of data, such as image data, audio data, and so forth. In some implementations, the document text 108 may include text associated with one or more items (e.g., goods or services) that may be purchased, leased, subscribed, and so forth from an online store. The document embedding 106 may include a latent vector representation of the document text 108.

A semantic determination module 110 associated with the machine learning system 102 may determine first semantic identifier data 112(1) based on the document embedding 106. In some implementations, the semantic determination module 110 may include a decoder associated with an encoder-decoder transformer architecture. FIG. 1A depicts determination of first semantic identifier data 112(1) at a first time. Therefore, previously-determined semantic identifier data 112 associated with the document text 108 may not exist. In some implementations, a semantic start token 114 may also be provided as an input to the semantic determination module 110. The semantic start token 114 may not necessarily represent semantic information associated with the document text 108, but may function as an indicator that no previously-determined semantic identifier data 112 exists.

An identifier correspondence module 116 associated with the machine learning system 102 may determine second semantic identifier data 112(2) based on correspondence between the first semantic identifier data 112(1) and first codebook data 118(1). The first codebook data 118(1) may include a plurality of possible semantic identifier data 112 for first semantic identifier position. For example, the first semantic identifier data 112(1) determined using the semantic determination module 110 may include a soft value based on the document embedding 106 that does not necessarily match the semantic identifier data 112 indicated in the first codebook data 118(1). Correspondence between the first semantic identifier data 112(1) and the first codebook data 118(1) may be used to determine second semantic identifier data 112(2) from the first codebook data 118(1) that is the most similar to the first semantic identifier data 112(1).

For example, for a given document (d) and a given semantic identifier position (t), the semantic determination module 110 may determine semantic identifier data 112($c_d^t$, while $c_d^{<t}$ may represent semantic identifier data 112 that precedes the semantic identifier position t, if present) based on the document embedding 106 ($h_d^t$). Codebook data 118 for the given semantic identifier position (t) may include an embedding matrix ($E^t \in R^{K \times D}$, where K is the size of the codebook data 118 and D is the size of the hidden dimension). Each embedding of the codebook data 118 ($e_j^t \in R^D$) may therefore correspond to a specific semantic identifier data 112 ($e_j^t$) at a given position (t). Therefore, based on the embedding matrix ($E^t$), a discrete semantic identifier data 112 for the document (d) at the given position (t) may be determined using a dot-product lookup ($P_s$), as indicated in Equations 1 and 2:

$$P_s\langle c_d^t = e_j^t \mid c_d^{<t}, d \rangle = \text{Softmax}_{e_j^t \in E^t}(h_d^t \cdot e_j^t) \qquad \text{EQUATION 1}$$

$$c_d^t = \text{argmax}_{e_j^t} P_s(c_d^t = e_j^t \mid c_d^{<t}, d) \qquad \text{EQUATION 2}$$

To train the machine learning system 102 and determine one or more parameters associated with the text encoding module 104, semantic determination module 110, first codebook data 118(1), or combinations thereof, an identifier decoding module 120 may be used to determine decoded text 122(1) based on the second semantic identifier data 112(2). Because the semantic identifier data 112(2) represents semantic information included in the document text 108, the decoded text 122(1) may at least partially correspond to the document text 108. The extent to which the decoded text 122(1) corresponds to the document text 108 may be indicative of the accuracy of the machine learning system 102 for generation of semantic identifier data 112 that represents the semantic meaning of document text 108. In some implementations, an embedding that represents a portion of the document text 108 may also be provided to the identifier decoding module 120 as an input. For example, a masking module 124 may determine a masked embedding 126(1) based on the document embedding 106, the masked embedding 126(1) including a first portion of the document embedding 106 that is masked and a second portion of the document embedding 106 that is not masked and may be used by the identifier decoding module 120 when determining the decoded text 122(1). In other implementations, a masked embedding 126(1) may be determined based on the document text 108, such as by encoding a portion of the document text 108, or by encoding all of the document text 108 then masking a portion of the document text 108. In some implementations, for each successive semantic position of determined semantic identifier data 112, a greater portion of the masked embedding 126(1) may include masked document text 108. For example, a first masked embedding 126(1) may mask 50% of the document text 108 and include 50% unmasked document text 108, a subsequent masked embedding 126 for a second semantic identifier position may mask 70% of the document text 108, and a masked embedding 126 for a third semantic identifier position may mask 90% of the document text. Because successive semantic identifier data 112 represents a larger amount of semantic information associated with the document text 108, a smaller amount of unmasked text may be necessary to determine decoded text 122(1).

In some implementations, the identifier decoding module 120 may include a shallow bidirectional transformer (TRM) layer. For example, the shallow bidirectional transformer layer may include a multi-head self-attention function in which semantic identifier data 112(2) is used as a query (q) in an input embedding, and the masked embedding 126(1) is used as keys (k) and values (v) in the input embedding. Continuing the example, the decoded text 122(1) ($P_{recon}$) determined based on the second semantic identifier data

112(2) ($c_d^t$) and a masked embedding 126(1) ($d_{ht}$) may be determined based on Equation 3, in which W represents the token embedding matrix:

$$P_{recon}(\omega \mid c_d^t, d_{ht}) =$$

EQUATION 3

$$\text{softmax}\left(W \sum_t TRM(q = c_d^t, k = d_{ht}, v = d_{ht})\right)$$

In some implementations, to further benefit the training of the parameters of the text encoding module 104 and the semantic determination module 110, an approximated arg-max operation may be used to determine a modified version of the second identifier data 112(2) ($\hat{c}_d^t$) that may be used in place of the second semantic identifier data 112(2) ($c_d^t$) as indicated in Equation 4:

$$\hat{c}_d^t = \begin{cases} \text{argmax}_{e_j^t \in E^t} h_d^t \cdot e_j^t & \text{forward pass} \\ \left(\text{softmax}_{e_j^t \in E^t} h_d^t \cdot e_j^t\right) e_j^t & \text{backward pass} \end{cases}$$

EQUATION 4

A loss determination module 128 may determine one or more loss values 130(1) based on a difference between the decoded text 122(1) and the document text 108. In some implementations, the loss determination module 128 may access loss data 132, which may be indicative of one or more rules, algorithms, thresholds, and so forth that may be used to determine loss values 130 based on correspondence between the decoded text 122(1) and document text 108. For example, a loss value 130($L_{recon}^t$) associated with reconstruction of the document text 108 may be determined based on Equation 5:

$$L_{recon}^t = -\sum_{\omega \in d} \log P_{recon}(\omega \mid c_d^{\leq t}, d_{ht})$$

EQUATION 5

Because optimizing only based on the objective of the identifier decoding module 120 may introduce a bias toward specific semantic identifier data 112, in some implementations, a contrastive loss value 130 may also be determined to increase the diversity in determined semantic identifier data 112. For example, a contrastive loss value 130($L_{contrastive}^t$) may be determined based on Equation 6:

$$L_{contrastive}^t = -\sum_t \log \frac{\exp(h_d^t \cdot h_d^t)}{\exp(h_d^t \cdot h_d^t) + \sum_{c_{d'}^{\leq t}, c_d^{\leq t}} \exp(h_d^t \cdot h_d^t)}$$

EQUATION 6

In cases previously-determined semantic identifier data 112 exists, such as when semantic identifier data 112 for a current semantic identifier position (t) is a position subsequent to the first position, a commitment loss value 130 may also be determined. For example, a commitment loss value 130($L_{commitment}^t$) may be determined based on Equation 7:

$$L_{commitment}^t = -\sum_d \sum_{j < t} \log P_s\left(c_d^j \mid d, c_d^{\leq j}\right)$$

EQUATION 7

A training module 134 may be used to determine one or more trained parameters 136(1) for the machine learning system 102 based on the loss value(s) 130(1). The trained parameters 136(1) may be associated with one or more of the text encoding module 104, the semantic determination module 110, or the first codebook data 118(1). For example, semantic identifier data 112 included in the first codebook data 118(1) may be modified to minimize one or more loss values 130(1). In some implementations, when multiple loss values 130 are determined, a sum of the determined loss values 130 (e.g., $L_{recon}^t + L_{constrastive}^t + L_{commit}^t$) may be used to determine the trained parameters 136(1).

FIG. 1A depicts, at a first time T1, determining first semantic identifier data 112(1) based on a document embedding 106 and second semantic identifier data 112(2) based on correspondence between the first semantic identifier data 112(1) and first codebook data 118(1) associated with a first position of a semantic identifier. The second semantic identifier data 112(2) may therefore be associated with a first position in a semantic identifier. As shown in FIG. 1B, at a second time T2 after the first time T1, semantic identifier data 112 for a second position of a semantic identifier may be determined.

For example, both the document embedding 106 and the second semantic identifier data 112(2) determined at the first time T1 may be used as inputs to the semantic determination module 110. The semantic determination module 110 may determine third semantic identifier data 112(3) based on the document embedding 106 and second semantic identifier data 112(2). The third semantic identifier data 112(3) may represent semantic information included in the document text 108, and may include a greater amount of semantic information due to use of the second semantic identifier data 112(2) as an input, due to the semantic information that is also included in the second semantic identifier data 112(2).

The identifier correspondence module 116 may determine correspondence between the third semantic identifier data 112(3) and second codebook data 118(2). The second codebook data 118(2) may include a plurality of possible semantic identifier data 112 for a second semantic identifier position. For example, the third semantic identifier data 112(3) determined using the semantic determination module 110 may include a soft value based on the document embedding 106 that does not necessarily match the semantic identifier data 112 indicated in the second codebook data 118(2). Correspondence between the third semantic identifier data 112(3) and the second codebook data 118(2) may be used to determine fourth semantic identifier data 112(4) that is included in the second codebook data 118(2) and that is similar to the third semantic identifier data 112(3). In some implementations, the fourth semantic identifier data 112(4) may be determined based on a dot product operation as indicated in Equations 1 and 2.

The identifier decoding module 120 may determine decoded text 122(2) based on the fourth semantic identifier data 112(4). The masking module 124 may determine a masked embedding 126(2) based on the document embedding 106 or document text 108, which may be used as an input to the identifier decoding module 120. The masked embedding 126(2) used in conjunction with the fourth semantic identifier data 112(4) may include a larger portion of masked document text 108 and a smaller portion of unmasked document text 108 when compared to the masked embedding 126(1) used with the second semantic identifier data 112(2) shown in FIG. 1A. For example, because the fourth semantic identifier data 112(4) is determined based on the document embedding 106 and the second semantic identifier data 112(2) (which also includes semantic information associated with the document text 108), the fourth semantic identifier data 112(4) may include a larger amount of semantic information than the second semantic identifier data 112(2), and a smaller portion of the document text 108 in the masked embedding 126(2) may be necessary to determine the decoded text 122(2).

The loss determination module 128 may determine one or more loss values 130(2) based on differences between the decoded text 122(2) and the document text 108, and the loss value(s) 130(2) may be used by the training module 134 to determine one or more trained parameters 136(2) for the text encoding module 104, the semantic determination module 110, or the second codebook data 118(2).

As shown in FIG. 1C, at a third time T3 after the second time T2, semantic identifier data 112 for a third position of a semantic identifier 140 may be determined. Both the document embedding 106 and the fourth semantic identifier data 112(4) determined at the second time T2 may be used as inputs to the semantic determination module 110. In some implementations, the second semantic identifier data 112(2) determined at the first time T1 may also be used as an input to the semantic determination module 110. The semantic determination module 110 may determine fifth semantic identifier data 112(5) based on the document embedding 106 and fourth semantic identifier data 112(4), and in some implementations based on the second semantic identifier data 112(2). The fifth semantic identifier data 112(5) may represent semantic information included in the document text 108, and may include a greater amount of semantic information than previously-determined semantic identifier data 112 due to use of the fourth semantic identifier data 112(4) as an input, which also includes semantic information.

The identifier correspondence module 116 may determine correspondence between the fifth semantic identifier data 112(5) and third codebook data 118(3). The third codebook data 118(3) may include a plurality of possible semantic identifier data 112 for a third semantic identifier position. For example, the fifth semantic identifier data 112(5) determined using the semantic determination module 110 may include a soft value based on the document embedding 106 that does not necessarily match the semantic identifier data 112 indicated in the third codebook data 118(3). Correspondence between the fifth semantic identifier data 112(5) and the third codebook data 118(3) may be used to determine sixth semantic identifier data 112(6) that is included in the third codebook data 118(3) and that is similar to the fifth semantic identifier data 112(5). In some implementations, the sixth semantic identifier data 112(6) may be determined based on a dot product operation as indicated in Equations 1 and 2.

The identifier decoding module 120 may determine decoded text 122(3) based on the sixth semantic identifier data 112(6). The masking module 124 may determine a masked embedding 126(3) based on the document embedding 106 or document text 108, which may be used as an input to the identifier decoding module 120. The masked embedding 126(3) used in conjunction with the sixth semantic identifier data 112(6) may include a larger portion of masked document text 108 and a smaller portion of unmasked document text 108 when compared to the masked embedding 126(2) used with the fourth semantic identifier data 112(4) shown in FIG. 1B. For example, because the sixth semantic identifier data 112(6) is determined based on the document embedding 106 and the second fourth semantic identifier data 112(4), which also includes semantic information associated with the document text 108, the sixth semantic identifier data 112(6) may include a larger amount of semantic information than the fourth semantic identifier data 112(4), and a smaller portion of the document text 108 in the masked embedding 126(3) may be necessary to determine the decoded text 122(3).

The loss determination module 128 may determine one or more loss values 130(3) based on differences between the decoded text 122(3) and the document text 108, and the loss value(s) 130(3) may be used by the training module 134 to determine one or more trained parameters 136(3) for the text encoding module 104, the semantic determination module 110, or the third codebook data 118(3).

In some implementations, an identifier association module 138 may determine a semantic identifier based on the second semantic identifier data 112(2), the fourth semantic identifier data 112(4), and the sixth semantic identifier data 112(6), which may be associated with the document text 108 for use in subsequent operations, such as indexing, analysis, recommendations, retrieval, and so forth. For example, FIG. 1C depicts the semantic identifier 140 including the second semantic identifier data 112(2) in a first position 142(1), the fourth semantic identifier data 112(4) in a second position 142(2), and the sixth semantic identifier data 112(6) in a third position 142(3).

In a similar manner, after training of the machine learning system 102, when a subsequent document is provided as an input to the machine learning system 102 for determination of a semantic identifier 140 for the subsequent document, the trained text encoding module 104 may determine an embedding based on the text of the subsequent document. The trained semantic determination module 110 and identifier correspondence module 116 may sequentially determine semantic identifier data 112 based on the text of the document and the first codebook data 118(1) for a first semantic position 142(1), second codebook data 118(2) for a second semantic position 142(2), and third codebook data 118(3) for a third semantic position 142(3). For each successive semantic position 142, the semantic determination module 110 may use semantic identifier data 112 for the previous semantic position 142 as an input. The identifier association module 138 may then associate the determined semantic identifier 140 with the subsequent document.

While FIGS. 1A-1C depict a system that determines semantic identifier data 112 for three positions 142 associated with a semantic identifier 140, in other implementations, a semantic identifier 140 may include more than three positions 142. For example, in some cases, due to use of codebook data 118 to determine semantic identifier data 112 that is included in the codebook data 118, some document text 108 may be associated with the same semantic identifier data 112 for the first position 142(1), second position 142(2), and third position 142(3) as other document text 108. Semantic identifier data 112 for a fourth position 142 may be associated with document text 108 to facilitate differentiation of document text 108 based on semantic identifiers 140. In some implementations, semantic identifier data 112 for a fourth position 142 may include a random or pseudo-random value.

FIG. 2 is a flow diagram 200 depicting an implementation of a method for training a machine learning system 102 to determine semantic identifiers 140 based on the text of received documents. At 202, a first embedding may be determined based on first text. For example, one or more documents may be used to train the machine learning system 102. As described with regard to FIG. 1, a text encoding module 104 may be used to encode the document text 108 of a document to determine an embedding that represents characteristics of the document text 108.

At 204, first semantic identifier data 112(1) may be determined based on the first embedding. For example, as described with regard to FIG. 1, a semantic determination module 110 may determine semantic identifier data 112 based on a document embedding 106. In some implementations, the encoder used to determine the document embedding 106 and a decoder used to determine the first semantic identifier data 112(1) may include a T5 encoder-decoder transformer architecture. In some implementations, a semantic start token 114 may also be used as an input when determining the first semantic identifier data 112(1).

At 206, second semantic identifier data 112(2) may be determined based on the first semantic identifier data 112(1) and first codebook data 118(1). The first codebook data 118(1) may indicate semantic identifier data 112 for a first semantic position 142(1) of a semantic identifier 140. For example, a semantic identifier 140 may include three positions 142, with each successive position 142 including semantic identifier data 112, such as a token, that represents the document text 108 of a document with grater granularity. Continuing the example, documents having sematic identifiers 140 with matching sematic identifier data 112 in earlier positions 142 that differ in later positions 142 may include text having similar semantic meanings, while documents having semantic identifiers 140 with semantic identifier data 112 that differs in earlier positions 142 may include text having dissimilar semantic meanings. To facilitate indexing and classification of documents, a selected set of semantic identifier data 112 for each semantic position 142, represented by codebook data 118 may be used. For example, the second semantic identifier data 112(2) may be data included in the first codebook data 118(1) that is the most similar to the first semantic identifier data 112(1). In some implementations, the second semantic identifier data 112(2) may be determined using a dot product operation, as indicated in Equations 1 and 2.

At 208, second text may be determined based on the second semantic identifier data 112(2) and a second embedding that represents a first portion of the first text. For example, as described with regard to FIG. 1A, an identifier decoding module 120 may receive the second semantic identifier data 112(2) as an input, and in some implementations may receive a masked embedding 126(1) that represents a portion of the document text 108, and may determine decoded text 122(1) based on these inputs. In some implementations, the identifier decoding module 120 may include a shallow bidirectional transformer (TRM) layer. For example, the shallow bidirectional transformer layer may include a multi-head self-attention function in which semantic identifier data 112(2) is used as a query in an input embedding, and the masked embedding 126(1) is used as keys and values in the input embedding, as described with regard to Equations 3-5.

At 210, one or more first loss values 130(1) may be determined based on a difference between the first text and the second text. For example, a loss value 130 may be determined based on a reconstruction objective to reconstruct the document text 108 based on the second semantic identifier data 112(2), as indicated in Equation 5. Because the expected reconstruction outcome—the document text 108—is known, a loss value 130 may be determined based on differences between the decoded text 122(1) and the document text 108. As described with regard to Equations 6 and 7, in some implementations, additional loss values 130 may be determined to improve training of specific components of the machine learning system 102 and decrease bias.

At 212, one or more first parameters of a machine learning model may be determined based on the first loss value(s) 130(1). For example, one or more of the text encoding module 104, semantic determination module 110, or first codebook data 118(1) may be modified based on the loss value(s) 130(1).

At 214, third semantic identifier data 112(3) may be determined based on the first embedding and the second semantic identifier data 112(2). For example, the third semantic identifier data 112(3) may be associated with a second semantic position 142(2) of a semantic identifier 140. As described with regard to FIG. 1B, the semantic identifier data 112(2) associated with the previous position 142 of the semantic identifier 140 may be used as an input to the semantic determination module 110 to determine the third semantic identifier data 112(3). Because the second semantic identifier data 112(2) includes semantic information associated with the document text 108 in addition to the first embedding, the determined third semantic identifier data 112(3) may include additional semantic information or more specific or granular semantic information when compared to the second semantic identifier data 112(2).

As 216, fourth semantic identifier data 112(4) may be determined based on the third semantic identifier data 112(3) and second codebook data 118(2) that indicates semantic identifier data 112 for a second sematic position 142(2) of a semantic identifier 140. For example, the second codebook data 118(2) may indicate a selected set of semantic identifier data 112 for the second semantic position 142(2) of the semantic identifier 140, which may differ from the semantic identifier data 112 indicated in the first codebook data 118(1). As described previously, the determined fourth semantic identifier data 112(4) may be included in the second codebook data 118(2) and may represent the semantic identifier data 112 that is most similar to the third semantic identifier data 112(3). In some implementations, the fourth semantic identifier data 112(4) may be determined based on Equations 1 and 2, described previously.

At 218, third text may be determined based on the fourth semantic identifier data 112(4) and a third embedding that represents a second portion of the first text. The second portion is smaller than the first portion. For example, as described with regard to FIG. 1B, because the fourth semantic identifier data 112(4) represents a larger amount of semantic information associated with the document text 108 when compared to the second semantic identifier data 112(2), a smaller amount of the original text may be needed to generate decoded text 122(2).

At 220, one or more second loss values 130(2) may be determined based on a difference between the first text and the third text. As described previously, in some implementations, a loss value 130 may be determined based at least in part on a reconstruction objective indicated in Equation 5. As described with regard to Equations 6 and 7, in some implementations, additional loss values 130 may be determined based in part on previously-determined semantic identifier data 112 to improve training of specific components of the machine learning system 102.

At 222, one or more second parameters of the machine learning model may be determined based on the second loss value(s) 130(2). For example, one or more of the text encoding module 104, semantic determination module 110, or second codebook data 118(2) may be modified based on the second loss value(s) 130(2).

At 224, fifth semantic identifier data 112(5) may be determined based on the first embedding and the fourth semantic identifier data 112(4). In some implementations, the fifth semantic identifier data 112(5) may also be determined based in part on the second semantic identifier data 112(2). For example, the fifth semantic identifier data 112(5) may be associated with a third semantic position 142(3) of a semantic identifier 140. The semantic identifier data 112 associated with one or more previous positions 142 of the semantic identifier 140 may be used as an input to the semantic determination module 110 to determine the fifth semantic identifier data 112(5). Because the previous semantic identifier data 112 includes semantic information associated with the document text 108 in addition to the first embedding, the fifth semantic identifier data 112(5) may include additional semantic information or more specific or granular semantic information when compared to the previous semantic identifier data 112.

At 226, sixth semantic identifier data 112(6) may be determined based on the fifth semantic identifier data 112(5) and third codebook data 118(3) that indicates semantic identifier data 112 for a third semantic position 142(3) of the semantic identifier 140. The third codebook data 118(3) may indicate a selected set of semantic identifier data 112 for the third semantic position 142(3) of the semantic identifier 140, which may differ from the semantic identifier data 112 indicated in the first codebook data 118(1) and second codebook data 118(2). As described previously, the sixth semantic identifier data 112(6) may be included in the third codebook data 118(3) and may represent the semantic identifier data 112 in the third codebook data 118(3) that is most similar to the fifth semantic identifier data 112(5). In some implementations, the sixth semantic identifier data 112(6) may be determined using a dot product operation as described in Equations 1 and 2.

At 228, fourth text may be determined based on the sixth semantic identifier data 112(6) and a fourth embedding that represents a third portion of the first text. The third portion of the first text may be smaller than the second portion and the first portion. Because the sixth semantic identifier data 112(6) represents a larger amount of semantic information associated with the document text 108 when compared to the fourth semantic identifier data 112(4) and second semantic identifier data 112(2), a smaller amount of the original text may be needed to generate decoded text 122(3).

At 230, one or more third loss values 130(3) may be determined based on a difference between the first text and the fourth text. As described previously, in some implementations, a loss value 130 may be determined based at least in part on a reconstruction objective indicated in Equation 5. In some implementations, additional loss values 130 may be determined based in part on previously—determined semantic identifier data 112 to improve training of specific components of the machine learning system 102. For example, one or more additional loss values 130(3) may be determined based on Equations 6 and 7.

At 232, one or more third parameters of the machine learning model may be determined based on the third loss value(s) 130(3). For example, one or more of the text encoding module 104, semantic determination module 110, or third codebook data 118(3) may be modified based on the third loss value(s) 130(3).

While FIG. 2 describes a method that determines semantic identifier data 112 for three positions 142 associated with a semantic identifier 140, in other implementations, a semantic identifier 140 may include more than three positions 142. In some cases, a particular document or other text may be associated with the same semantic identifier data 112 for the first, second, and third positions 142 as a different document. Semantic identifier data 112 for a fourth position 142 that is associated with a document may be used to differentiate that document from other documents associated with the same semantic identifier data 112 for the first, second, and third positions 142. In some implementations, semantic identifier data 112 for a fourth position 142 may include a random or pseudo-random value.

Figure 3:
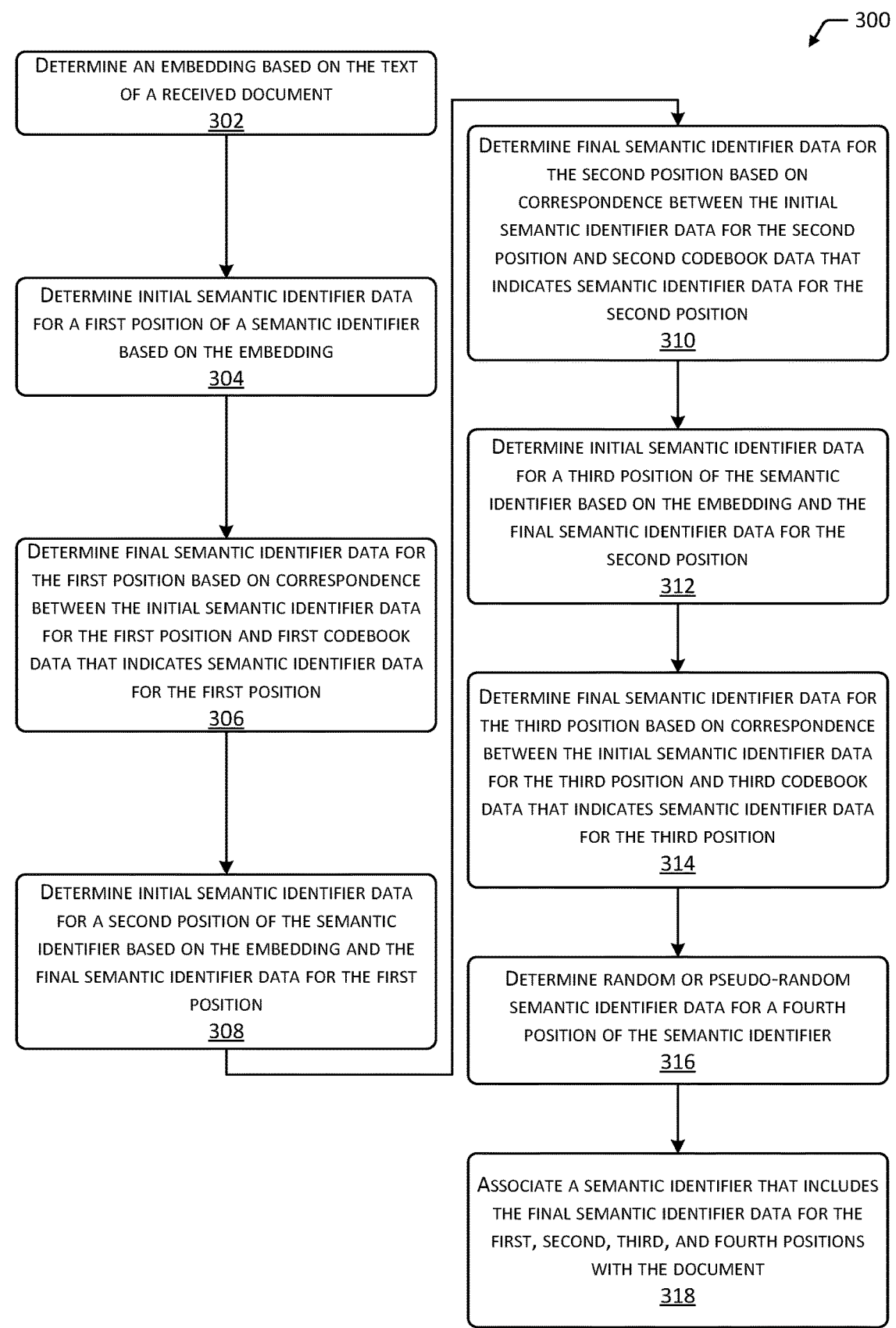
FIG. 3 is a flow diagram depicting an implementation of a method for using a trained machine learning system to determine semantic identifiers based on the text of received documents.

FIG. 3 is a flow diagram 300 depicting an implementation of a method for using a trained machine learning system 102 to determine semantic identifiers 140 based on the text of received documents. At 302, an embedding may be determined based on the text of a received document. For example, the machine learning system 102 may include a text encoding module 104 that is trained to determine latent vector representations of text that represent semantic information associated with words, subwords, groups of words, and so forth. The machine learning system 102 may be trained in the manner described with regard to FIGS. 1 and 2.

At 304, initial semantic identifier data 112 for a first position 142(1) of a semantic identifier 140 may be determined based on the embedding. For example, a semantic determination module 110, such as a decoder or part of an encoder-decoder transformer architecture, may determine a token or other portion of a semantic identifier 140 for the first position 142(1) of the semantic identifier 140 based on the embedding that represents the text of the document, and in some cases based on a semantic start token 114.

At 306, final semantic identifier data 112 for the first position 142(1) may be determined based on correspondence between the initial semantic identifier data 112 for the first position 142(1) and first codebook data 118(1). The first codebook data 118(1) may indicate a set of semantic identifier data 112 for the first position 142(1). Use of a selected set of semantic identifier data 112 indicated in the first codebook data 118(1) may facilitate indexing and classification of documents. As described with regard to FIGS. 1 and 2, the first codebook data 118(1) may include one or more trainable parameters. For example, semantic identifier data 112 included in the first codebook data 118(1) may be changed during training of the machine learning system 102 described with regard to FIGS. 1 and 2.

At 308, initial semantic identifier data 112 for a second position 142(2) of the semantic identifier 140 may be determined based on the embedding and the final semantic identifier data 112 for the first position 142(1). As described with regard to FIGS. 1B, 1C, and 2, previously—determined semantic identifier data 112 for previous positions 142 of the semantic identifier 140 may be used as an input to a semantic determination module 110 to determine subsequent semantic identifier data 112. The subsequent semantic identifier data 112 may represent a larger amount of semantic information, or more specific or granular semantic information than previously—determined semantic identifier data 112.

At 310, final semantic identifier data 112 for the second position 142(2) may be determined based on correspondence between the initial semantic identifier data 112 for the second position 142(2) and second codebook data 118(2). The second codebook data 118(2) may indicate a set of semantic identifier data 112 for the second position 142(2), which may differ from the semantic identifier data 112 indicated in the first codebook data 118(1). As described with regard to FIGS. 1 and 2, the second codebook data 118(2) may include one or more trainable parameters. For example, semantic identifier data 112 included in the second codebook data 118(2) may be changed during training of the machine learning system 102 described with regard to FIGS. 1 and 2.

At 312, initial semantic identifier data 112 for a third position 142(3) of the semantic identifier 140 may be determined based on the embedding and the final semantic identifier data 112 for the second position 142(2). In some implementations, the final semantic identifier data 112 for the first position 142(1) may also be used as an input to the semantic determination module 110 to determine the semantic identifier data for the third position 142(3).

At 314, final semantic identifier data 112 for the third position 142(3) may be determined based on correspondence between the initial semantic identifier data 112 for the third position 142(3) and third codebook data 118(3). The third codebook data 118(3) may indicate a set of semantic identifier data 112 for the third position 142(3), which may differ from the semantic identifier data 112 indicated in the first codebook data 118(1) and second codebook data 118(2). As described with regard to FIGS. 1 and 2, the third codebook data 118(3) may include one or more trainable parameters. For example, semantic identifier data 112 included in the third codebook data 118(3) may be changed during training of the machine learning system 102 described with regard to FIGS. 1 and 2.

At 316, random or pseudo-random semantic identifier data 112 may be determined for a fourth position 142 of the semantic identifier 140. For example, to enable differentiation between documents in cases where multiple documents may be associated with the same semantic identifier data 112 for the first, second, and third positions 142, semantic identifier data 112 for one or more additional positions 142 may be determined. In some implementations, semantic identifier data 112 for a fourth position 142 may include a random or pseudo-random value. In other implementations, semantic identifier data 112 for a fourth position 142 may include an assigned unique or arbitrary value, such as by incrementing a numeral sequentially for each successive document that is assigned semantic identifier data 112 for the fourth position 142.

At 318, a semantic identifier 140 that includes the final semantic identifier data 112 for the first, second, third, and fourth positions may be associated with the document. For example, as described with regard to FIG. 1C, an identifier association module 138 may determine a semantic identifier 140 based on the semantic identifier data 112 determined using the machine learning system 102 and may associate the semantic identifier 140 with a received document. The semantic identifier 140 may subsequently be usable for retrieval, analysis, indexing, recommendation, and other tasks associated with the document due to the semantic identifier 140 representing semantic information associated with the text of the document.

Figure 4:
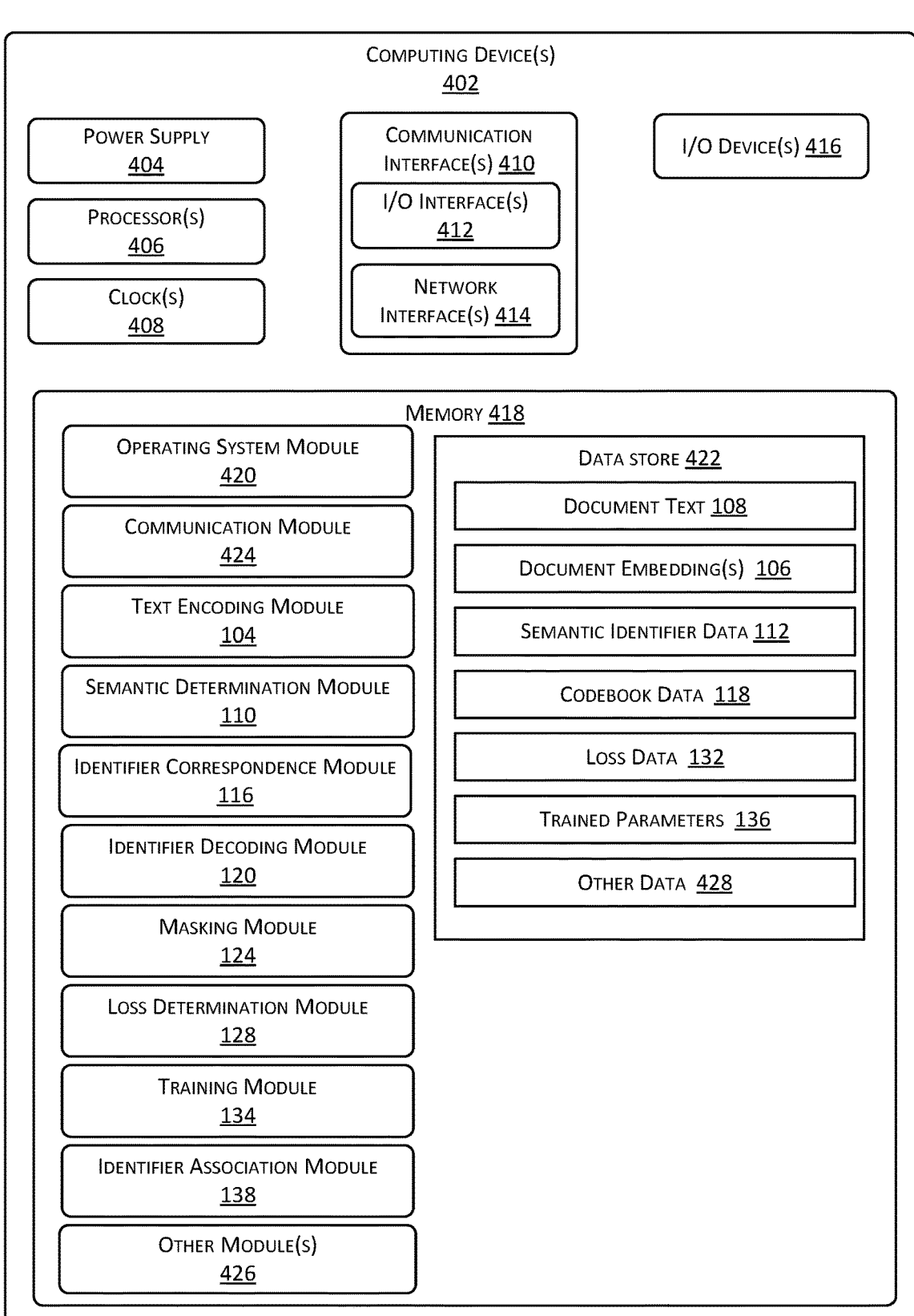
FIG. 4 is a block diagram depicting an implementation of a computing device within the present disclosure.

FIG. 4 is a block diagram 400 depicting an implementation of a computing device 402 within the present disclosure. The computing device 402 may include one or more servers, personal computing devices, portable computing devices, network-accessible storage devices, and so forth, which may store and execute one or more machine learning systems 102. As such, while FIG. 4 depicts a single block diagram 400, the depicted computing device 402 may include any number of computing devices of similar or different types.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (12C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices, network attached storage devices, and so forth.

A communication module 424 may be configured to establish communications with one or more other computing devices 402. Communications may be authenticated, encrypted, and so forth.

The memory 418 may also store the text encoding module 104. The text encoding module 104 may determine embeddings based on the text of documents. For example, a document embedding 106 may include a latent vector representation of document text 108. Parameters of the text encoding module 104 may be trained based on the processes described with regard to FIGS. 1 and 2. In some implementations, the text encoding module 104 may be part of a T5 encoder-decoder transformer architecture.

The memory 418 may additionally store the semantic determination module 110. The semantic determination module 110 may determine first semantic identifier data 112 for a position of a semantic identifier 140 based on a document embedding 106, and in some cases based on semantic identifier data 112 determined for a previous position of the semantic identifier 140. In some implementations, the semantic determination module 110 may include a decoder associated with a T5 encoder-decoder transformer architecture. In some implementations, a semantic start token 114 may also be provided as an input to the semantic determination module 110, such as when semantic identifier data 112 for a previous position of the semantic identifier 140 is not present.

The memory 418 may store the identifier correspondence module 116. The identifier correspondence module 116 may determine correspondence between initial semantic identifier data 112 and codebook data 118 for a given position of a semantic identifier 140. For example, initial semantic identifier data 112 determined based on a document embedding 106 may include a soft value that does not necessarily match a set of semantic identifier data 112 indicated in codebook data 118. Correspondence between semantic identifier data 112 and the codebook data 118 may be used to determine semantic identifier data 112 included in the codebook data 118 that is the most similar to the initial semantic identifier data 112. In some implementations, the corresponding semantic identifier data 112 may be determined using a dot product operation, as described with regard to Equations 1 and 2.

The memory 418 may also store the identifier decoding module 120. The identifier decoding module 120 may decode semantic identifier data 112 to determine decoded text 122. In some implementations, an embedding that represents a portion of the original document text 108 may also be used as an input to the identifier decoding module 120. The extent to which the decoded text 122 corresponds to the document text 108 may be indicative of the accuracy of the machine learning system 102 for generation of semantic identifier data 112 that represents the semantic meaning of document text 108. In some implementations, the identifier decoding module 120 may include a shallow bidirectional transformer (TRM) layer. For example, the shallow bidirectional transformer layer may include a multi-head self-attention function in which semantic identifier data 112 is used as a query in an input embedding, and an embedding representing a portion of the document text 108 is used as keys and values in the input embedding. In some implementations, the decoded text 122 may be determined based on Equation 3.

The memory 418 may additionally store the masking module 124. The masking module 124 may determine masked embeddings 126 based on an embedding representing a document or based on the text of the document. A masked embedding 126 may represent a first portion of document text 108 as masked tokens and a second portion as unmasked tokens. The portion of the document text 108 that is masked may be selected based on the position of the semantic identifier 140 for which the masked embedding 126 is used as an input. For example, a first masked embedding 126(1) may mask 50% of the document text 108 and include 50% unmasked document text 108, a subsequent masked embedding 126 for a second semantic identifier position 142(2) may mask 70% of the document text 108, and masked embedding 126 for a third semantic identifier position 142(3) may mask 90% of the document text. Because successive semantic identifier data 112 represents a larger amount of semantic information associated with the document text 108, a smaller amount of unmasked text may be necessary to determine decoded text 122.

The memory 418 may store the loss determination module 128. The loss determination module 128 may determine one or more loss values 130 based on a difference between the decoded text 122 and the text of a document. In some implementations, the loss determination module 128 may access loss data 132, which may be indicative of one or more rules, algorithms, thresholds, and so forth that may be used to determine loss values 132 based on correspondence between the decoded text 122 and document text 108. For example, a loss value 130 associated with reconstruction of the document text 108 may be determined based on Equation 5. Loss values 130 associated with previously—determined semantic identifier data 112 and used to increase diversity in determined semantic identifier data 112 may be determined based on Equations 6 and 7.

The memory 418 may also store the training module 134. The training module 134 may determine one or more trained parameters 136 for a machine learning system 102 based on one or more loss values 130. The trained parameters 136 may be associated with one or more of the text encoding module 104, the semantic determination module 110, or the codebook data 118. In some implementations, when multiple loss values 130 are determined, a sum of the determined loss values 130 may be used to determine trained parameters 136.

The memory 418 may additionally store the identifier association module 138. The identifier association module 138 may determine a semantic identifier 140 based on semantic identifier data 112 determined for different positions 142 of the semantic identifier 140 and associate the semantic identifier 140 with a document to facilitate indexing, analysis, retrieval, and other tasks associated with the document.

Other modules 426 may also be present in the memory 418. For example, other modules 426 may include user interface modules for receiving user input and providing output, permission or authorization modules for sending data to or receiving data from the computing device 402, for modifying configurations or settings, or for modifying training data or parameters of the machine learning system 102. Other modules 426 may also include encryption modules to encrypt and decrypt communications between computing devices 402, authentication modules to authenticate communications sent or received by computing devices 402, and so forth. Other modules 426 may include modules for generation and modification of training data and training of the components of the machine learning system 102.

Other data 428 within the data store(s) 422 may include configurations, settings, preferences, and default values associated with computing devices 402. Other data 428 may also include encryption keys and schema, access credentials, and so forth. Other data 428 may include various rules, algorithms, and thresholds for performance of various tasks. Other data 428 may also include user interface data for generation of interfaces to receive user input and present output. Other data 428 may additionally include training data for training of machine learning systems 102.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more non-transitory memories storing computer-executable instructions; and
one or more hardware processors to execute the computer-executable instructions to:
train a machine learning model to determine semantic identifiers based on text inputs by:
determining a first embedding based on first text;
providing the first embedding as an input to a first decoder to determine first semantic identifier data that represents semantic information associated with the first text;
determining correspondence between the first semantic identifier data and first codebook data, wherein the first codebook data indicates a plurality of semantic identifier tokens associated with a first semantic position of the first semantic identifier data, and wherein the first semantic position is indicative of placement of the first semantic identifier data with respect to other semantic identifier data associated with a semantic identifier;
based on the correspondence between the first semantic identifier data and the first codebook data, determining second semantic identifier data, wherein the second semantic identifier data is included in the plurality of semantic identifier tokens of the first codebook data and is within a threshold similarity of the first semantic identifier data;
providing the second semantic identifier data and a second embedding that represents a first portion of the first text as inputs to a second decoder, wherein the second decoder determines second text based on the second semantic identifier data and the second embedding;
determining a first loss value based on a difference between the second text and the first text; and
modifying at least one parameter associated with one or more of an encoder, the first decoder, or the first codebook data based on the first loss value.

2. The system of claim 1, further comprising computer-executable instructions to:
provide the first embedding and the second semantic identifier data as inputs to the first decoder to determine third semantic identifier data that represents semantic information associated with the first text and the second semantic identifier data;

determine correspondence between the third semantic identifier data and second codebook data, wherein the second codebook data indicates a plurality of semantic identifier tokens associated with a second semantic position of the third semantic identifier data that differs from the first semantic position of the first semantic identifier data, and wherein the second semantic position is indicative of placement of the third semantic identifier data with respect to other semantic identifier data associated with the semantic identifier;

based on the correspondence between the third semantic identifier data and the second codebook data, determine fourth semantic identifier data, wherein the fourth semantic identifier data is included in a plurality of semantic identifier tokens of the second codebook data and is within a threshold similarity of the third semantic identifier data;

provide the fourth semantic identifier data and a third embedding that represents a second portion of the first text as inputs to the second decoder, wherein the second portion is smaller than the first portion, and wherein the second decoder determines third text based on the fourth semantic identifier data and the third embedding;

determine a second loss value based on a difference between the third text and the first text; and modify at least one parameter associated with one or more of the encoder, the first decoder, or the second codebook data based on the second loss value.

3. The system of claim 1, further comprising computer-executable instructions to:

receive third text as an input to the machine learning model, wherein the machine learning model:

determines a third embedding based on the third text;

provides the third embedding as an input to the first decoder to determine third semantic identifier data; and determines fourth semantic identifier data based on correspondence between the third semantic identifier data and the first codebook data; and associate the fourth semantic identifier data with the third text.

4. A system comprising:

one or more non-transitory memories storing computer-executable instructions; and one or more hardware processors to execute the computer-executable instructions to:

determine a first embedding based on first text;

determine, based on the first embedding, first semantic identifier data that represents semantic information associated with the first text;

determine correspondence between the first semantic identifier data and first codebook data, wherein the first codebook data indicates a plurality of semantic identifier tokens associated with a first semantic position of the first semantic identifier data, wherein the first semantic position is indicative of placement of the first semantic identifier data with respect to other semantic identifier data associated with a semantic identifier;

determine second semantic identifier data based on the correspondence between the first semantic identifier data and the first codebook data;

determine second text based on the second semantic identifier data;

determine a first loss value based on a difference between the second text and the first text; and determine at least one parameter associated with one or more of a machine learning model or the first codebook data based on the first loss value.

5. The system of claim 4, wherein the machine learning model includes an encoder that determines the first embedding based on the first text, and a first decoder that determines the first semantic identifier data based on the first embedding, and wherein the at least one parameter is further associated with one or more of the encoder or the first decoder.

6. The system of claim 5, wherein a second decoder that differs from the first decoder determines the second text based on the second semantic identifier data.

7. The system of claim 4, wherein the first semantic identifier data is further determined based on third semantic identifier data that represents semantic information associated with the first text, and wherein the third semantic identifier data is associated with a second semantic position in the semantic identifier for the first text that precedes the first semantic position of the first semantic identifier data.

8. The system of claim 4, further comprising computer-executable instructions to:

provide the second semantic identifier data and a second embedding that represents a portion of the first text to a decoder, wherein the decoder determines the second text.

9. The system of claim 4, further comprising computer-executable instructions to:

determine, based on the first embedding and the second semantic identifier data, third semantic identifier data that represents semantic information associated with the first text;

determine correspondence between the third semantic identifier data and second codebook data, wherein the second codebook data indicates a plurality of semantic identifier tokens associated with a second semantic position of the third semantic identifier data, wherein the second semantic position is indicative of placement of the third semantic identifier data with respect to other semantic identifier data associated with the semantic identifier, and wherein the first semantic position precedes the second semantic position;

determine fourth semantic identifier data based on the correspondence between the third semantic identifier data and the second codebook data;

determine third text based on the fourth semantic identifier data;

determine a second loss value based on a difference between the third text and the first text; and determine at least one parameter associated with one or more of the machine learning model or the second codebook data based on the second loss value.

10. The system of claim 9, further comprising computer-executable instructions to:

provide the second semantic identifier data and a second embedding that represents a first portion of the first text to a decoder, wherein the decoder determines the second text; and provide the fourth semantic identifier data and a third embedding that represents a second portion of the first text to the decoder, wherein the second portion is smaller than the first portion, and wherein the decoder determines the third text.

11. The system of claim 9, further comprising computer-executable instructions to:

determine, based on the first embedding and the fourth semantic identifier data, fifth semantic identifier data that represents semantic information associated with the first text;

determine correspondence between the fifth semantic identifier data and third codebook data, wherein the third codebook data indicates a plurality of semantic identifier tokens associated with a third semantic position of the fifth semantic identifier data, wherein the third semantic position is indicative of placement of the fifth semantic identifier data with respect to other semantic identifier data associated with the semantic identifier, and wherein the second semantic position precedes the third semantic position;

determine sixth semantic identifier data based on the correspondence between the fifth semantic identifier data and the third codebook data;

determine fourth text based on the sixth semantic identifier data;

determine a third loss value based on a difference between the fourth text and the first text; and determine at least one parameter associated with one or more of the machine learning model or the third codebook data based on the third loss value.

12. The system of claim 11, further comprising computer-executable instructions to:

provide the second semantic identifier data and a second embedding that represents a first portion of the first text to a decoder, wherein the decoder determines the second text;

provide the fourth semantic identifier data and a third embedding that represents a second portion of the first text to the decoder, wherein the second portion is smaller than the first portion, and wherein the decoder determines the third text; and provide the sixth semantic identifier data and a fourth embedding that represents a third portion of the first text to the decoder, wherein the third portion is smaller than the second portion, and wherein the decoder determines the fourth text.

13. The system of claim 12, wherein the first portion includes fifty percent of the first text, the second portion includes thirty percent of the first text, and the third portion includes ten percent of the first text.

14. The system of claim 4, further comprising computer-executable instructions to:

receive third text as an input to the machine learning model, wherein the machine learning model:

encodes the third text to determine a second embedding;

determines third semantic identifier data based on the second embedding;

determines fourth semantic identifier data based on the third semantic identifier data and the first codebook data; and determines fifth semantic identifier data based on correspondence between the third semantic identifier data and the first codebook data; and associate the fifth semantic identifier data with the third text.

15. A system comprising:

one or more non-transitory memories storing computer-executable instructions; and one or more hardware processors to execute the computer-executable instructions to:

determine a first embedding based on first text;

determine, based on the first embedding, first semantic identifier data that represents semantic information associated with the first text;

determine correspondence between the first semantic identifier data and first codebook data, wherein the first codebook data indicates a plurality of semantic identifier tokens associated with a first semantic position of the first semantic identifier data, and wherein the first semantic position is indicative of placement of the first semantic identifier data with respect to other semantic identifier data associated with a semantic identifier; and determine second semantic identifier data based on the correspondence between the first semantic identifier data and the first codebook data.

16. The system of claim 15, further comprising computer-executable instructions to:

determine second text based on the second semantic identifier data;

determine a first loss value based on a difference between the second text and the first text; and determine at least one parameter associated with one or more of a machine learning model or the first codebook data based on the first loss value.

17. The system of claim 16, further comprising computer-executable instructions to:

provide the second semantic identifier data and a second embedding that represents a first portion of the first text to a decoder, wherein the decoder determines the second text.

18. The system of claim 17, further comprising computer-executable instructions to:

determine, based on the first embedding and the second semantic identifier data, third semantic identifier data that represents semantic information associated with the first text;

determine correspondence between the third semantic identifier data and second codebook data, wherein the second codebook data indicates a plurality of semantic identifier tokens associated with a second semantic position of the third semantic identifier data, wherein the second semantic position is indicative of placement of the third semantic identifier data with respect to other semantic identifier data associated with the semantic identifier, and wherein the first semantic position precedes the second semantic position;

determine fourth semantic identifier data based on the correspondence between the third semantic identifier data and the second codebook data;

provide the fourth semantic identifier data and a third embedding that represents a second portion of the first text to the decoder, wherein the second portion is smaller than the first portion, and wherein the decoder determines third text;

determine a second loss value based on a difference between the third text and the first text; and determine at least one parameter associated with one or more of the machine learning model or the second codebook data based on the second loss value.

19. The system of claim 18, further comprising computer-executable instructions to:

determine, based on the first embedding and the fourth semantic identifier data, fifth semantic identifier data that represents semantic information associated with the first text;

determine correspondence between the fifth semantic identifier data and third codebook data, wherein the third codebook data indicates a plurality of semantic identifier tokens associated with a third semantic position of the fifth semantic identifier data, wherein the third semantic position is indicative of placement of the fifth semantic identifier data with respect to other semantic identifier data associated with the semantic identifier, and wherein the second semantic position precedes the third semantic position;

determine sixth semantic identifier data based on the correspondence between the fifth semantic identifier data and the third codebook data;

provide the sixth semantic identifier data and a fourth embedding that represents a third portion of the first text to the decoder, wherein the third portion is smaller than the second portion, and wherein the decoder determines fourth text;

determine a third loss value based on a difference between the fourth text and the first text; and determine at least one parameter associated with one or more of the machine learning model or the third codebook data based on the third loss value.

20. The system of claim 15, wherein the first semantic identifier data is further determined based on third semantic identifier data that represents semantic information associated with the first text, and wherein the third semantic identifier data is associated with a second semantic position in the semantic identifier for the first text that precedes the first semantic position of the first semantic identifier data.

\* \* \* \* \*